3,513,163
21-TRI(LOWER ALKYL)-SILOXYPREGNANE-3,20-
DIONES
Edward A. Brown, Wilmette, Ill., assignor to G. D. Searle
& Co., Chicago, Ill., a corporation of Delaware
No Drawing. Filed Feb. 12, 1968, Ser. No. 704,559
Int. Cl. C07c 173/00, 169/34
U.S. Cl. 260—239.55           8 Claims

ABSTRACT OF THE DISCLOSURE

Preparation of the captioned compounds—for example, 17α - hydroxy - 21 - trimethylsiloxypregn - 4-ene-3,11,20-trione—and their valuable pharmacological properties—including anti-inflammatory, neoglycogenetic, and occasional anti-algal activity—are disclosed.

The application for Letters Patent securing the invention herein described and claimed is a continuation-in-part of applicant's prior copending application Ser. No. 528,410 filed Feb. 18, 1966, and now abandoned.

This invention relates to 21-tri(low alkyl)-siloxypregnane-3,20-diones and congeners, and to processes for the preparation thereof. More particularly, this invention provides new, useful, and unobvious chemical compounds of the formula

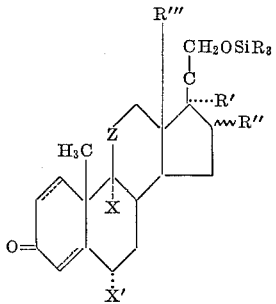

wherein $R_3$ represents 3 lower alkyl radicals, alike or different; R' represents hydrogen, hydroxyl, or a lower alkanoyloxy radical; R" represents hydrogen or a methyl radical; R''' represents a lower alkyl radical; X and X' each represent hydrogen or halogen; Z represents a methylene, β-hydroxymethylene, or carbonyl radical; and the dotted lines in ring A each represent an optional double bond. Alternatively, R' and R", taken together, represent a radical of the formula

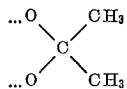

Typical of the lower alkyl radicals represented by $R_3$ and R" are methyl, ethyl, propyl, isopropyl, butyl, sec-butyl, tert-butyl, pentyl, neopentyl, hexyl, isohexyl, heptyl, and like monovalent, acrylic, unsaturated, straight- or branched-chain, hydrocarbon groupings of empirical formula

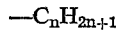

wherein $n$ represents a positive integer less than 8. Those skilled in the art will recognize that a lower alkanoyloxy radical is a radical of the formula —O—CO-lower alkyl the lower alkyl constituent being defined as before. Among the halogens represented by X and X', especially fluorine and chlorine are preferred.

The wavy line in the 16-position on the steroid nucleus signifies that the substituent represented by R" can be in either alpha or beta configuration except when R' and R", taken together with carbon atoms 16 and 17 of the nucleus, give rise to a cyclic acetal, in which event alpha configuration obtains as indicated by the first formula in column 1.

The compounds to which this invention relates are useful by reason of their valuable pharmacological properties. Thus, for example, they share a capacity to counteract the edema and granuloma-formation characteristic of the inflammatory response to tissue insult. They are also neoglycogenetic and manifest occasional anti-algal activity. The product of Example 1 hereinafter, for instance, inhibits the growth of *Chlorella vulgaris*.

Preparation of the subject compounds proceeds simply by contacting a steroid of the formula

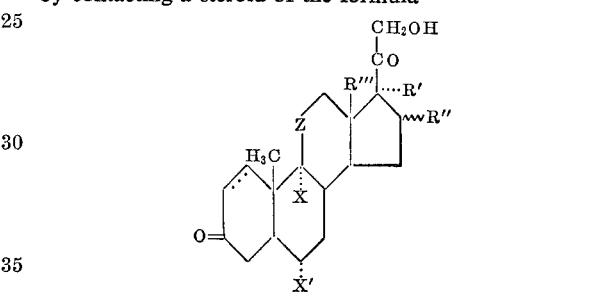

with a chlorosilane of the formula

in pyridine solution, R, R', R", R''', X, X', Z, and the dotted lines in ring A having the meanings previously assigned. Addition to the reaction mixture of the corresponding hexaalkyldisilazane.

tends to enhance the yield.

The following examples describe in detail compounds illustrative of the present invention and methods which have been devised for the preparation thereof. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

21-trimethylsiloxy-5α-pregnane-3,20-dione

To a solution of 20 parts of 21-hydroxy-5α-pregnane-3,20-dione in 500 parts of pyridine is added 34 parts of trimethylchlorosilane and 77 parts of hexamethyldisilazane. The resultant mixture is stirred for 1 minute at room temperature, then allowed to stand thereat for 5 minutes. The mixture thus obtained is poured into 5000 parts of ice water. The waxy precipitate which forms is isolated by filtration, washed with water, dried in air, and recrystallized from hexane to give 21-trimethylsiloxy-5α-pregnane-3,20-dione melting at approximately 104–105°. The product has the formula

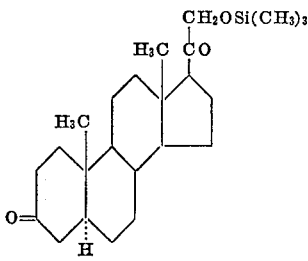

EXAMPLE 2

21-trimethylsiloxy-5β-pregnane-3,20-dione

To a solution of 20 parts of 21-hydroxy-5β-pregnane-3,20-dione in 500 parts of pyridine is added 34 parts of trimethylchlorosilane and 77 parts of hexamethyldisilazane. The resultant mixture is stirred for 1 minute at room temperature, then allowed to stand thereat for 5 minutes. The mixture thus obtained is poured into 3200 parts of ice water, precipitating an oil which granulates upon agitation for 30 minutes. The resultant solid is filtered off, washed with water, dried in air, and crystallized from hexane to give 21-trimethylsiloxy-5β-pregnane-3,20-dione melting at 66–70°. The product has the formula

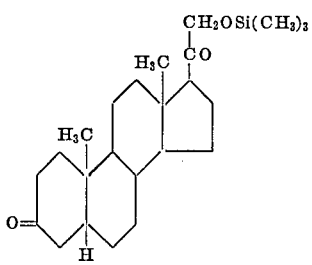

EXAMPLE 3

17α-hydroxy-21-trimethylsiloxypregn-4-ene-3,11,20-trione

To a solution of 4 parts of cortisone in 200 parts of pyridine is added 34 parts of trimethylchlorosilane and 62 parts of hexamethyldisilazane. The resultant mixture is stirred for 1 minute at room temperature, then allowed to stand thereat for 5 minutes. The mixture thus obtained is poured into 2000 parts of ice water. The oil which separates is removed and diluted with 264 parts of hexane, whereupon precipitation occurs. The precipitate is filtered off after 2 hours at 5°, dried in air, and recrystallized from ethyl acetate to give 17α-hydroxy-21-trimethylsiloxypregn-4-ene-3,11,20-trione melting at 187–189°. The product has the formula

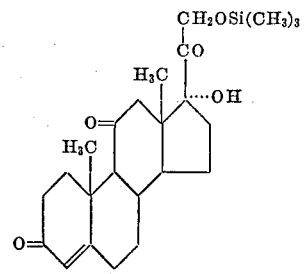

EXAMPLE 4

9α-fluoro-11β,17α-dihydroxy-21-trimethylsiloxypregn-4-ene-3,20-dione

To a solution of 2 parts of 9α-fluoro-11β,17α,21-trihydroxypregn-4-ene-3,20-dione in 100 parts of pyridine is added 17 parts of trimethylchlorosilane and 31 parts of hexamethyldisilazane. The resultant mixture is stirred for 1 minute at room temperature, then allowed to stand thereat for 30 minutes. The mixture thus obtained is poured into 1200 parts of ice water. The oil which separates is extracted with ether; and the ether extract is washed with water, dried over anhydrous sodium sulfate, and stripped of solvent by vacuum distillation. The residual liquid solidifies on standing. Recrystallized from a mixture of ethyl acetate and hexane, it affords 9α-fluoro-11β,17α-dihydroxy-21-trimethylsiloxypregn-4-ene - 3,20-dione which melts at 148°, resolidifies above this temperature, and melts again at 190°. The product has the formula

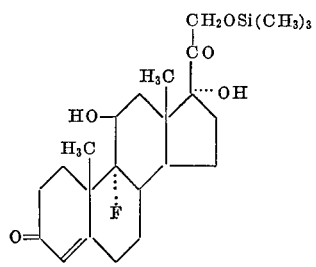

EXAMPLE 5

17α-acetoxy-9α-fluoro-11β-hydroxy-21-trimethylsiloxypregna-1,4-diene-3,20-dione

To a solution of 2 parts of 17α-acetoxy-9α-fluoro-11β,21-dihydroxypregna-1,4-diene-3,20-dione in 100 parts of pyridine is added 17 parts of trimethylchlorosilane and 29 parts of hexamethyldisilazane. The resultant mixture is stirred for 1 minute at room temperature, then held thereat for 5 minutes, and finally poured into 500 parts of ice water. The mixture thus obtained is extracted with ether. The ether extract is washed with water, dried over anhydrous sodium sulfate, and stripped of solvent by vacuum distillation. The residue is 17α-acetoxy-9α-fluoro-11β-hydroxy-21-trimethylsiloxypregna-1,4-diene-3,20 - dione, having the formula

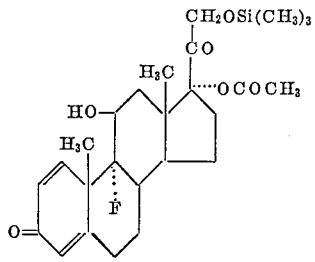

EXAMPLE 6

9α-fluoro-11β,17α-dihydroxy-16α-methyl-21-trimethylsiloxypregna-1,4-diene-3,20-dione To a solution of 2 parts of 9α-fluoro-11β,17α, 21 - trihydroxy 16α - methylpregna - 1,4 - diene - 3,20-dione in 100 parts of pyridine is added 17 parts of trimethylchlorosilane and 29 parts of hexamethyldisilazane. The resultant mixture is stirred for 1 minute at room temperature, then allowed to stand thereat for 5 minutes. The mixture thus obtained is poured into 1200 parts of ice water. The oil which separates congeals to a waxy solid. The solid is filtered off, washed with water, dried in air, and crystallized from ethyl acetate to give 9α-fluoro - 11β,17α - dihydroxy - 16α - methyl-21-trimethylsiloxypregna-1,4-diene-3,20-dione, melting at 229–232°. The product has the formula

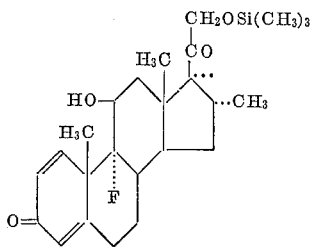

EXAMPLE 7

6α,9α - difluoro - 11β,16α,17α - trihydroxy-21-trimethylsiloxypregna-1,4-diene - 3,20 - dione cyclic 16,17-acetal with acetone To a solution of 2 parts of 6α,9α-difluoro-11β,16α,17α,21-tetrahydroxypregna-1,4-diene-3,20-dione cyclic 16,17-acetal with acetone in 100 parts of pyridine is added 17 parts of trimethylchlorosilane and 29 parts of hexamethyldisilazane. The resultant mixture is stirred for 1 minute at room temperature, then allowed to stand thereat for 5 minutes. The mixture thus obtained is poured into 1000 parts of ice water. The oil which separates is extracted with ether. The ether extract is washed consecutively with water and saturated aqueous sodium chloride, dried over anhydrous sodium sulfate, and stripped of solvent by distillation. The residue, recrystallized from ethyl acetate, affords 6α,9α - difluoro - 11β,16α,17α - trihydroxy-21-trimethylsiloxypregna-1,4-diene-3,20-dione cyclic 16,17-acetal with acetone melting at 234–240°. The product has the formula

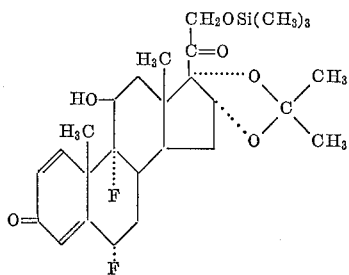

What is claimed is:
1. A compound selected from the group consisting of compounds of the formula

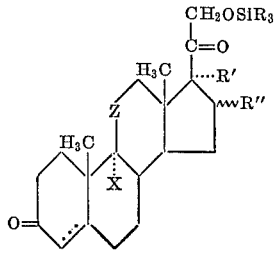

and compounds of the formula

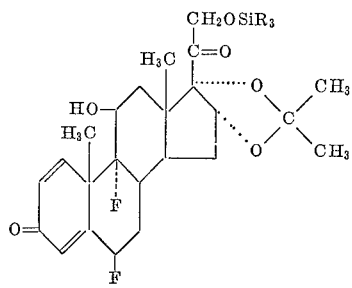

wherein R represents lower alkyl; R' represents hydrogen, hydroxyl, or lower alkanoyloxy; R" represents hydrogen or methyl; X represents hydrogen or fluorine; Z represents methylene, β-hydroxymethylene, or carbonyl; and the dotted lines in ring A indicate that the ring can be saturated, Δ⁴, or Δ¹,⁴.

2. A compound according to claim 1, the formula of which is

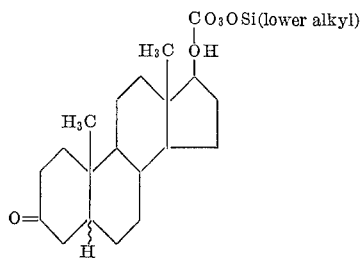

3. A compound according to claim 1 which is 21-trimethylsiloxy-5α-pregnane-3,20-dione.

4. A compound according to claim 1 which is 21-trimethylsiloxy-5β-pregnane-3,20-dione.

5. A compound according to claim 1 which is 17α-hydroxy-21-trimethylsiloxypregn-4-ene-3,11,20-trione.

6. A compound according to claim 1 which is 9α-fluoro-11β,17α-dihydroxy-21-trimethylsiloxypregn - 4 - ene-3,20-dione.

7. A compound according to claim 1 which is 9α-floro-11β,17α - dihydroxy - 16α - methyl - 21 - trimethylsiloxypregna-1,4-diene-3,20-dione.

8. 6α,9α - difluoro - 11β,16α,17α - trihydroxy - 21 - trimethylsiloxypregna-1,4-diene-3,20-dione cyclic 16,17-acetal with acetone.

References Cited
UNITED STATES PATENTS
3,311,644    3/1967    Brown et al.

HENRY A. FRENCH, Primary Examiner

U.S. Cl. X.R.
260—397.45, 397.47, 999

UNITED STATES PATENT OFFICE
CERTIFICATE OF CORRECTION

Patent No. 3,513,163   Dated  October 8, 1970

Inventor(s) Edward A. Brown

It is certified that error appears in the above-identified patent and that said Letters Patent are hereby corrected as shown below:

Column 1, line 3, "DIONES" should be --DIONES AND CONGENERS--.

Column 1, line 23, "21-tri(low alkyl)-" should be --21-tri(lower alkyl)- --.

Column 1, line 57, "R''" should be --R'''--.

Column 1, line 59, "acrylic" should be --acyclic--.

Column 2, formula

" 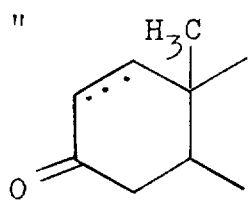 "   should be   -- 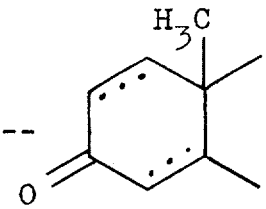 --.

Column 4, line 66, "trihydroxy 16α" should be --trihydroxy-16α--.

Column 4, line 75, "flloro" should be --fluoro--.

Column 5, first formula,

" 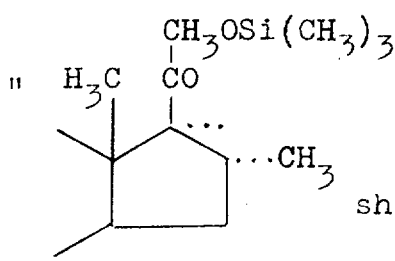 "   should be   -- 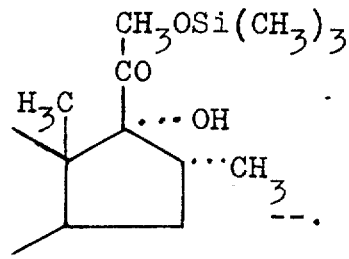 --.

Page 2 of 2

UNITED STATES PATENT OFFICE
CERTIFICATE OF CORRECTION

Patent No. 3,513,163      Dated October 8, 1970

Inventor(s) Edward A. Brown

It is certified that error appears in the above-identified patent and that said Letters Patent are hereby corrected as shown below:

Column 5, third formula,

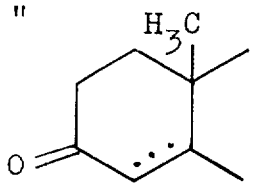 should be -- 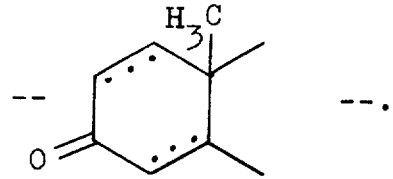 --.

Column 6, first formula

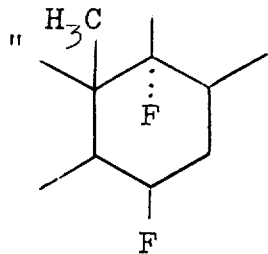 should be -- 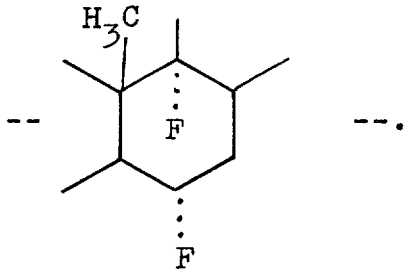 --.

Column 6, second formula

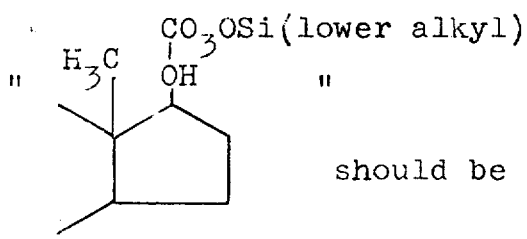 should be -- 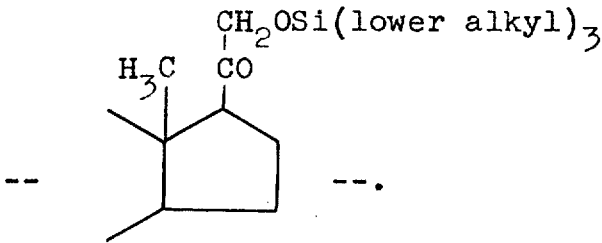 --.

Column 6, line 44, "9α-flloro" should be --9α-fluoro--.

Signed and sealed this 15th day of December 1970.

(SEAL)
Attest:

Edward M. Fletcher, Jr.
Attesting Officer

WILLIAM E. SCHUYLER, JR.
Commissioner of Patents